United States Patent Office 3,185,732
Patented May 25, 1965

3,185,732
METHOD FOR PRODUCING OXIMES
Pierre Bapseres and Christos Nicolaides, Pau, France, assignors to Société National des Petroles d'Aquitaine, Paris, France, a corporation of France
No Drawing. Filed July 11, 1962, Ser. No. 209,264
Claims priority, application France, Mar. 6, 1962, 890,097
8 Claims. (Cl. 260—566)

The present invention relates to the preparation of hydroxylamine and its derivatives and, particularly, oximes. A very advantageous application of the invention is the preparation of oximes of cycloaliphatic ketones.

Hydroxylamine, in the form of salts or substituted derivatives, such as the suphate and sulphonates, is often employed at present for the preparation of oximes. The oximes of cyclohexanone or methyl-cyclohexanone are prepared and then, when subjected to the Beckmann transformation, produce the corresponding caprolactams, which are materials of prime importance in the preparation of polyamides. This preparation, however, requires oximes of considerable purity. Consequently, the hydroxylamine compound used, as well as the ketone, should also be pure.

The present invention makes it possible to employ the so-called Raschig reaction, which involves the reaction between a soluble nitrite, a sulphite, and $SO_2$, to produce a hydroxylamine with a more or less impure bisulphite and/or sulphite solution. The invention permits use of aqueous solutions obtaining during the washing of various industrial gases containing $SO_2$ and possibly also $H_2S$. Such industrial gases include oven gases, coke effluents, gases from gas works, metallurgical installations, and residual gases from the preparation of sulphur by the Claus process. The ability to use these gases constitutes an important industrial advance. Also, the process according to the invention dispenses with cooling of the reaction medium to 0° C. which has been necessary during the Raschig reaction and permits better results to be obtained at ambient temperature that at 0° C.

In making use of the invention in the preparation of oximes, especially those of cycloaliphatic ketones, one obtains the advantage of an improvement in the purity of the ketone used. It also makes it possible to effect hydrolysis and oximation of the compound obtained from the hydroxylamine used in a single operating phase in the same apparatus. The process of the invention can also simplify, if desired, the preparation of the oxime by carrying out the Raschig reaction, hydrolysis and oximation within the same aqueous solution and in the same vessel.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principles of the invention may be employed.

The invention consists, in a general way, in treating a solution of a sulphite with at least one ketone or aldehyde in order to form the corresponding sulphite compound and in then reacting the sulphite compound of the ketone or aldehyde with a nitrite and suphur dioxide.

Although the sulphite or bisulphite compounds are generally soluble in water, it is often possible to bring about their precipitation by suitable adjustment of various factors. For example, one or more of the following conditions can be modified for this purpose: (1) higher concentration of sulphite and/or bisulphite in solution, (2) addition of substances decreasing the solubility of the bisulphite compounds, such as alcohols and mineral salts such as ammonium sulphate, and (3) cooling of the solution.

It thus becomes possible to precipitate (in the form of the bisulphite compound of cyclohexanone) the bisulphite and sulphite contained in a solution of an alkali metal, alkaline earth and/or ammonium sulphite, bisulphite and thiosulphate solution. The precipitate contains only the bisulphite to the exclusion of the other compounds of the solution treated and in particular thiosulphate. This is important because, if the same initial solution is used for the Raschig reaction in the usual manner, the hydroxylamine sulphonate is obtained in an amount (relative to the nitrite) which is lower when the content of thiosulphate is higher. The latter, in fact, needlessly takes up the nitro group.

According to one important embodiment, the bisulphite compound is separated from the initial solution, dried, and (if required) washed. It is then dissolved in water in a suitable medium for reaction with a soluble nitrite, (particularly an alkali metal, alkaline earth metal or ammonium nitrite) and with $SO_2$, which is passed into the solution. The hydroxylamine disulphonate of the cation present, for example ammonium, is thus obtained in solution containing the initial ketone.

When the object of the operation is to prepare the hydroxylamine, this may be separated from the ketone solution.

When, however, it is desired to form the corresponding oxime, the same solution is placed under conditions of temperature and pH suitable for effecting, firstly, hydrolysis of the hydroxylamine ammonium disulphonate to the monosulphonate and then to produce oximation. By final neutralisation of the medium, precipitation of the oxime is obtained. It should be mentioned that the ketone or aldehyde employed automatically undergoes a certain purification because of its passage through the bisulphite state of combination in the first phase of the operation. According to an important feature of the invention, the yield of oxime (with respect to the bisulphite compound) is considerably improved by the addition to the medium of a small quantity of thiosulphate. Surprisingly enough, tests show that the presence of thiosulphate considerably improves the oximation. In obtaining the hydroxylamine by the standard process, in the basence of the ketone, the yield is poor when the concentrations of thiosulphate are high.

In carrying out the invention, it is particularly suitable to employ ammonium salts, such as ammonium bisulphite and nitrite. In this way only ammonium sulphate (useful as fertilizer) needs to be recovered after the final neutralisation.

According to a preferred embodiment of the preparation of the hydroxylamine, nitrous vapors are used instead of the nitrite. These vapors are introduced into an ammoniacal solution of the bisulphite compound of the ketone or aldehyde chosen. The nitrous vapors can be produced by any known means. They are advantageously formed by controlled oxidation of $NH_3$, giving an $NO/NO_2$ ratio of between 1.5 and 0.8, preferably between 1 and 1.1. During the introduction of the nitrous vapors into the solution, the latter can be maintained at a temperature from −5° to +35° C., preferably between 15° and 25° C., the temperature generally utilised being 20° C. The operation is stopped when the solution is substantially neutral and has a pH of 7.5 to 8.

The solution (which has absorbed the requisite proportion of nitrous vapors) is then subjected to the action of sulphur dioxide. This latter gas may be in the pure state or may be diluted with an inert gas. This absorption of $SO_2$ can take place at temperatures up to 35° C., while in the old process it is necessary to keep the temperature as near as possible to 0° C. The preferred range, according to the present invention, is from 15° to 25° C. In practice, the ambient temperature would be used, preferably around 20° C. Having begun the treatment with $SO_2$ on the solution at pH 7.5 to 8, the reaction is stopped when the pH has dropped to below 5 and in practice to around 3. At this time, the solution contains the initial ketone and the hydroxylamine ammonium disulphonate which has been formed. It is desirable to remove the excess sulphurous gases which are present by entrainment in an inert gas, such as air, nitrogen, smoke or the like, in known manner.

In order to produce the oxime in the solution obtained from the foregoing operations, it is advisable to proceed first with hydrolysis of the disulphonate into the monosulphonate. This hydrolysis occurs spontaneously at the ambient temperature. It can be accelerated by heating, if desired up to 100° C. and preferably around 50° C. At the latter temperature, the hydrolysis takes place in about 1 to 1½ hours.

The reaction between the hydroxylamine ammonium monosulphonate and the ketone present (particularly in the case of cyclohexanone) takes place very rapidly in 1 to 1½ hours in the same medium, at around 15° to 20° C. Consequently, if the hydrolysis has taken place above this temperature, it is only necessary to allow the solution to cool while it is being agitated, so as to obtain the desired oxime by precipitation following neutralisation with ammonia. However, as indicated above, the yield of oxime is improved by the addition of thiosulphate to the reaction medium. Consequently, according to a preferred form of the invention, the reaction medium contains thiosulphate, particularly in a proportion corresponding to a molar ratio of thiosulphate to bisulphite compound of 0.05 to 0.2 and preferably 0.1. For instance, the yield of oxime with respect to the bisulphite compound is in the order of 50%, without thiosulplate but exceeds 80% in the presence of thiosulphate.

It will be seen from the foregoing that, by starting with the bisulphite compound in solution, all the operations can be carried out in the same liquid phase and, if desired, can take place in the same vessel.

Though a very important embodiment involves separation of the bisulphite compound from the medium in which it is prepared, such a method of operation is not entirely necessary. In certain cases, depending on the nature and concentration of the bisulphite solution and on the particular ketone or aldehyde employed, it may be advantageous to carry out all the operations in the initial medium without preliminary separation of the bisulphite compound.

The process according to the invention can be carried out discontinuously or continuously. In the latter eventuality, suitable means are provided (for example, a series of successive reactors) to allow variation of the pH to be controlled during the course of the action of the $SO_2$ on the nitrite solution.

The invention is typified by the following examples given by way of illustration:

Example 1

One liter of sulphite liquor containing 5.9 moles of ammonium bisulphite was treated with 5.9 moles of cyclohexanone at the ambient temperature. The mixture was vigorously agitated. The bisulphite compound precipitated and was filtered, dried and washed. The weight of precipitate obtained was 1050 grams; purity 97%.

204 grams of this compound (1 mole) were dissolved in 1 liter of water. 84 ml. of 14.3 N $NH_4OH$ (1.2 moles) and 0.1 mole of ammonium thiosulphate were added to this solution. A stream of nitrous vapors ($NO/NO_2$ molar ratio=1.0) was introduced into the agitated solution which was cooled to around 20° C. by a circulation of water. The operation lasted for about 1 hour and consumed 1.6 moles of NO. The flow of gas was stopped when the pH reached the value of 7.5. Then, while still at 20° C., a stream of pure $SO_2$ was introduced at a rate of 37 liters per hour for 55 minutes. The final pH was 3.

After 48 hours of hydrolysis and oximation at the ambient temperature, the solution was neutralised with 310 milliliters of 5 normal ammonia. The weight of dry cyclohexanone-oxime obtained was 88 grams, representing a molar yield in relation to the bisulphite compound of 78%.

Example 2

Operation was carried out under the same conditions as those of Example 1, except for the entire absence of thiosulphate. The consumption of nitrous vapors was reduced to 1.3 moles, but the weight of oxime fell to 57 grams, representing a molar yield of 50.5% with respect to the bisulphite compound.

Example 3

Operation was carried out under the same conditions as Example 1, except that the hydrolysis and oximation phase was carried out at 50° C. for 2 hours 30 minutes. The yield of oxime was 72%.

Example 4

204 grams of the bisulphite compound of cyclohexanone (1 mole) were put into solution with 1 mole of ammonium nitrite and 0.1 mole of ammonium thiosulphate in 1 liter of water. This solution was treated with $SO_2$ at 18° C. for 50 minutes (rate 37 liters per hour).

The following operations were identical with those described in Example 1. The molar yield of oxime with respect to the bisulphite compound was 80%.

Example 5

One liter of liquor containing 5.9 moles of ammonium bisulphate was treated with 5.9 moles of methylcyclohexanone at room temperature, the mixture being agitated. The precipitate was filtered, dried, and washed. One mole of the precipitate was then dissolved in a liter of water and 1.2 moles of N $NH_4OH$ and 0.1 mole of ammonium thiosulphate were added to the solution. A stream of nitrous oxide vapors with a $NO/NO_2$ molar ratio of 1.0 was introduced into the agitated solution, the solution being cooled to around 20° C. The reaction lasted for an hour and consumed 1.6 moles of NO. The stream of gas was stopped when the pH reached 7.5; then, while still at 20° C., a stream of pure $SO_2$ was introduced at a rate of 37 liters per hour for 55 minutes. The final pH was 3.0. Hydrolysis and oximation took place for 48 hours at room temperature and then the solution was neutralized with 310 mils of 5 normal ammonia. The dry methylcyclohexanone oxime obtained represented a molar yield relative to the bisulphite compound of 78%.

Example 6

The operation was carried out with methylcyclohexanane under the same conditions as in Example 5, except that the thiosulphate was omitted. The consumption of nitrous oxide vapors was reduced to 1.3 moles, but the weight of oxime fell to a molar yield of 50.5% relative to the bisulphite compound.

Example 7

The operation was carried out with methylcyclohexanane under the same conditions as in Example 5, except that the hydrolysis and oximation phase was carried out at 50° C. for 2½ hours. The yield of oxime was 72%.

Example 8

One mole of the bisulphite compound of methylcyclohexanane was put into solution with one mole of ammonium nitrite and 0.1 mole of ammonium thiosulphate in 1 liter of water. This solution was treated with $SO_2$ at 18° C. for 50 minutes at a rate of 37 liters per hour. The parts of the operation which followed were similar to those of Example 5, resulting in a molar yield of oxime with respect to the bisulphite compound of 80%.

Other modes of applying the principles of the invention may be employed, change being made as regards the details described, provided the features stated in the following claims, or the equivalent of such, be employed.

The invention having been thus described, what is claimed as new and desired to secure by Letters Patent is:

1. A method for producing oximes, comprising the steps of
   (a) treating a solution of bisulphite with a material selected from the group consisting of cyclohexanone and methylcyclohexanone to form a bisulphite compound of the said material,
   (b) adding thiosulphate in the amount of 0.05 to 0.2 mol of thiosulphate per mol of bisulphite present,
   (c) subjecting the sulphite compound thus formed in an aqueous medium to nitrous oxide vapors at a temperature in the range from −5° C. to +35° C. until the pH is in the range from 7.5 to 8.0 and to sulphur dioxide at a temperature in the range from 15° C. to 25° C. until the pH decreases to 3.0,
   (d) hydrolyzing the resulting hydroxylamine ammonium disulphonate at a temperature in the range from 30° C. to 100° C., and
   (e) subjecting the resulting solution to oximation at room temperature with agitation in the presence of dissolved thiosulphate in the amount of 0.05 to 0.2 mol of thiosulphate per mole of bisulphite present.

2. A method for producing oximes, comprising the steps of
   (a) treating a solution of ammonium bisulphite with a cycloaliphatic ketone to form a bisulphite compound of the said material,
   (b) separating the bisulphite compound from the solution,
   (c) dissolving the bisulphite compound in water and adding to the solution obtained a water soluble thiosulphate in the amount of from 0.05 to 0.2 mol per mol of bisulphite
   (d) subjecting the solution thus formed to nitrous oxide vapors at a temperature in the range from −5° C. to +35° C. until the pH is in the range from 7.5 to 8.0 and to sulphur dioxide at a temperature in the range from −5° C. to +35° C. until the pH decreases to an amount in the range from 3.0 to 5.0,
   (e) permitting the solution to stand for hydrolation of the resulting hydroxylamine ammonium disulphonate at a temperature in the range from 30° C. to 100° C.
   (f) subjecting the resulting solution to oximation at room temperature with agitation in the presence of the dissolved thiosulphate in the amount of 0.05 to 0.2 mol of thiosulphate per mol of bisulphite present,
   (g) neutralizing the solution, and
   (h) separating the oxime thus formed.

3. A method for producing oximes, comprising the steps of
   (a) treating a solution of ammonium sulphite with a material selected from the group consisting of cyclohexanone and methylcyclohexanone to form a bisulphite compound of the said material,
   (b) subjecting the bisulphite compound thus formed in an aqueous medium containing dissolved thiosulphate in the amount of 0.05 to 0.2 mol of thiosulphate per mol of bisulphite present to a solution of nitrous oxide vapors at a temperature in the range from −5° C. to +35° C. and sulphur dioxide, and
   (c) hydrolyzing the hydroxylamine ammonium disulphonate so formed at a temperature in the range from 30° C. to 100° C. and maintaining the resultant solution at a temperature in the range from 15° C. to 25° C. with agitation to effect oximation of the said material present by the monosulphonate.

4. A method for producing oximes, comprising the steps of
   (a) treating a solution of ammonium bisulphite with a material selected from the group consisting of cyclohexanone and methylcyclohexanone to form a bisulphite compound of the said material,
   (b) subjecting the bisulphite compound thus formed in an aqueous medium containing 0.05 to 0.2 mol of a water soluble thiosulphate for each mol of bisulphite present to a solution of nitrous oxide vapors at a temperature in the range from 15° to 25° C. and sulphur dioxide, and
   (c) hydrolyzing the hydroxylamine ammonium disulphonate so formed at a temperature in the range from 30° C. to 100° C. and maintaining the resultant solution at ambient temperature with agitation in the presence of the dissolved thiosulphate to effect oximation of the said material present by the monosulphonate.

5. A method for producing oximes, comprising the steps of
   (a) treating a solution of ammonium bisulphite with a material selected from the group consisting of cyclohexanone and methylcyclohexanone to form a bisulphite compound of the said material,
   (b) subjecting the bisulphite compound thus formed in an aqueous medium containing 0.05 to 0.2 mol of ammonium thiosulphate for each mol of bisulphite present to a mixture of nitrogen dioxide and nitric oxide vapors at a temperature in the range from −5° C. to +35° C. in which the molar ratio $NO/NO_2$ is in the range from 0.8 to 1.5 and to sulphur dioxide until the pH decreases to a value in the range from 3 to 5, and
   (c) hydrolyzing the hydroxylamine ammonium disulphonate so formed at a temperature in the range from 30° C. to 100° C. and maintaining the resultant solution at a temperature in the range from 15° to 25° C. with agitation in the presence of the dissolved thiosulphate to effect oximation of the said material present by the monosulphonate.

6. A method for producing oximes, comprising the steps of
   (a) treating a solution of a bisulphite selected from the class consisting of sodium bisulphite, potassium bisulphite, and ammonium bisulphite with a material selected from the group consisting of cyclohexanone and methylcyclohexanone to form a bisulphite compound of the said material,
   (b) subjecting the bisulphite compound thus formed in an aqueous medium containing a water soluble thiosulphate in the amount of 0.05 to 0.2 mol of thiosulphate per mol of bisulphite present to a compound selected from the group consisting of alkaline metal nitrites, alkaline earth metal nitrites and ammonium nitrite and to sulphur dioxide at a temperature from −5° C. to +35° C. until the pH drops to a value in the range from 3 to 5, and
   (c) hydrolyzing the hydroxylamine ammonium disulphonate so formed at a temperature in the range from 30° C. to 100° C. and maintaining the resultant solution at a temperature in the range from 15° to 25° C. with agitation in the presence of the dissolved thiosulphate to effect oximation of the said material present by the monosulphonate.

7. A method for producing oximes, comprising the steps of
   (a) treating a solution of a sulphite selected from the class consisting of sodium sulphite, potassium sulphite, and ammonium sulphite with a material selected from the group consisting of cyclohexanone and methylcyclohexanone to form a sulphite compound of the said material,
(b) subjecting the sulphite compound thus formed in an aqueous medium containing a thiosulphate selected from the class consisting of sodium thiosulphate, potassium thiosulphate, and ammonium thiosulphate in an amount of 0.05 to 0.2 mol per mol of sulphite present to a mixture of the solution and sulphur dioxide and nitrous oxide vapors at a temperature in the range from 15° to 25° C. and the pH drops to a value in the range from 3 to 5, and
(c) hydrolyzing the hydroxylamine ammonium sulphonate so formed at a temperature in the range from 30° C. to 100° C. and maintaining the resultant solution at room temperature with agitation in the presence of the dissolved thiosulphate to effect oximation of the said material present by the monosulphonate.

8. A method of producing oximes, which consists in
(a) treating a solution of ammonium bisulphite with a ketone selected from the class consisting of cyclohexanone and methylcyclohexanone to form a bisulphite compound of the ketone,
(b) separating the bisulphite compound from the solution,
(c) dissolving said bisulphite compound in water and adding to the solution obtained 0.05 to 0.2 mol of ammonium thiosulphate per mol of the bisulphite present,
(d) subjecting the solution thus formed to a soluble nitrite selected from the group consisting of alkali metal, alkaline earth metal and ammonium nitrites in which the molar ratio $NO/NO_2$ is in the range from 0.8 to 1.5, at a temperature in the range from 15° to 25° C. until the pH of the solution is in the range of 7.5 to 8.0, and to sulphur oxide at 15° to 25° C. until the pH decreases to about 3,
(e) permitting the solution to stand for hydrolation of the resulting hydroxylamine ammonium disulphonate at a temperature in the range from 30° C. to 100° C.,
(f) subjecting the resulting solution to oximation at room temperature with agitation in the presence of the dissolved thiosulphate,
(g) neutralizing the solution, and
(h) separating the oxime thus formed.

References Cited by the Examiner
UNITED STATES PATENTS

| | | | |
|---|---|---|---|
| 2,447,583 | 8/48 | Koch | 260—566 |
| 2,462,009 | 2/49 | Morris et al. | |
| 2,562,205 | 7/51 | Novotny et al. | 260—566 |
| 2,812,238 | 11/57 | Quinn et al. | |
| 3,070,627 | 12/62 | Bostian et al. | 260—566 |

FOREIGN PATENTS

| | | |
|---|---|---|
| 545,359 | 8/57 | Canada. |
| 589,620 | 12/59 | Canada. |
| 724,219 | 2/55 | Great Britain. |

CHARLES B. PARKER, *Primary Examiner.*